United States Patent [19]

Schneider

[11] Patent Number: 4,489,820
[45] Date of Patent: Dec. 25, 1984

[54] METHOD AND APPARATUS FOR TRANSFERRING BOTTLES ARRIVING IN UPRIGHT POSITION IN LATERALLY ADJACENT ROWS ON A FEED CONVEYOR INTO A SINGLE ROW OF BOTTLES ON A DOWNSTREAM CONVEYOR

[75] Inventor: Egon Schneider, Neutraubling, Fed. Rep. of Germany

[73] Assignee: KRONES AG Hermann Kronseder, Maschinenfabrik, Neutraubling, Fed. Rep. of Germany

[21] Appl. No.: 456,208

[22] Filed: Jan. 7, 1983

[30] Foreign Application Priority Data

Jan. 29, 1982 [DE] Fed. Rep. of Germany ....... 3202991

[51] Int. Cl.³ .............................................. B65G 47/26
[52] U.S. Cl. ..................................... 198/448; 198/529
[58] Field of Search ............... 198/443, 448, 453, 454, 198/529, 452

[56] References Cited

U.S. PATENT DOCUMENTS 3,414,110 12/1968 Ellis et al. ........................... 198/443
3,633,728 1/1972 Chamberlin .
4,054,199 10/1977 Polderman ........................... 198/452

FOREIGN PATENT DOCUMENTS 1078939 3/1960 Fed. Rep. of Germany .
1975166 12/1967 Fed. Rep. of Germany .
2743885 4/1979 Fed. Rep. of Germany .
2830197 1/1980 Fed. Rep. of Germany ...... 198/454
3004259 8/1981 Fed. Rep. of Germany .
3025951 2/1982 Fed. Rep. of Germany ...... 198/453
1110794 4/1968 United Kingdom ................ 198/443
1233478 5/1971 United Kingdom .
1321689 6/1973 United Kingdom .
1342452 1/1974 United Kingdom .
492441 2/1976 U.S.S.R. .

OTHER PUBLICATIONS

Leaflet Smp-Standard Metal Products Company, "Straight-line Unscrambler".

Primary Examiner—Robert J. Spar
Assistant Examiner—Jonathan D. Holmes
Attorney, Agent, or Firm—Flynn, Thiel, Boutell & Tanis

[57] ABSTRACT

This invention relates to a method and apparatus for transferring bottles arriving in an upright position and in laterally adjacent rows on a feed conveyor into a single row of bottles on a downstream or discharge conveyor. The bottles are shifted laterally solely under a gravity effect from the feed conveyor, across an intermediate conveyor whereat they are successively accelerated to the downstream conveyor.

13 Claims, 2 Drawing Figures

METHOD AND APPARATUS FOR TRANSFERRING BOTTLES ARRIVING IN UPRIGHT POSITION IN LATERALLY ADJACENT ROWS ON A FEED CONVEYOR INTO A SINGLE ROW OF BOTTLES ON A DOWNSTREAM CONVEYOR

FIELD OF THE INVENTION

This invention relates to a method for transferring bottles arriving in upright position in laterally adjacent rows on a feed conveyor into a single row of bottles on a downstream conveyor, in which said bottles are shifted laterally solely under a gravity effect from said feed conveyor onto a laterally adjacent intermediate conveyor, on which they are successively accelerated during a transverse movement thereover to form a single row of bottles which is then transferred onto said downsteam conveyor, and relates further to apparatus for carrying out this method.

BACKGROUND OF THE INVENTION

In filling plants for bottles and similar containers there are usually several places, particularly upstream of high-speed processing machines such as inspection apparatus, filling apparatus or labelling apparatus, whereat the bottles or containers arriving at relatively low speed in a plurality of laterally adjacent rows have to be rearranged into a single row and to be considerably accelerated in the process. These locations are the most problematic ones of each filling plant with regard to noise and reliability of operation.

Known single-row rearrangement apparatus mostly comprise a pair of converging stationary guide surfaces forming a funnel for crowding the slowly moving stream of bottles together and for transferring the bottles onto the singlerow downstream conveyor which is driven at a faster speed. One of the two guide surfaces is frequently movably mounted or designed in the form of a roller fence or the like, whereby to avoid jamming and bridging of the bottles within the funnel-shaped rearrangement apparatus. Although the conveying efficiency of these known rearrangement apparatus is fairly satisfactory, they suffer from the disadvantage of an excessive noise level caused by the high backup pressure required for forcing the bottles through the funnel.

In DE-OS No. 30 04 259 there is described an apparatus of this type, in which the intermediate conveyor is inclined at an angle of about 5°, and a single guide surface for rearranging the bottle stream is located at the higher side of the intermediate conveyor. In this case, the bottles are transferred onto the faster running conveyor sections for successive acceleration solely by the guide surface extending obliquely with respect to the running direction of the conveyor. The inclination angle of about 5° is insufficient for overcoming the friction of rest between the bottles' bottoms and the conveyor surface and, therefore, there will not be any lateral sliding movement of the bottles solely under a gravitational effect, hereinafter sometimes referred to as declivity drift. The inclination has the sole purpose to cause bottles lying on their side to roll downwardly, so that they are able to pass underneath a further guide surface located at the lower side of the intermediate conveyor and not participate in the formation of the bottle stream on the intermediate conveyor. In this known apparatus, the pressure between the bottles themselves and between the bottles and the guide surface, which is determined by the shape of the guide surface and by the speeds of the individual conveyor portions, is lower than in apparatus having two funnel-fashion converging guide surfaces.

Nevertheless, the emission of noise of this known apparatus even at medium operating speeds still lies considerably above a medically acceptable noise level.

In the older DE-OS No. 30 25 951 there is also described apparatus for transferring bottles arriving in an upright position in laterally adjacent rows into a single row of bottles, comprising a feed conveyor for the laterally adjacent rows of bottles, an intermediate conveyor departing from a position laterally adjacent the end section of the feed conveyor, and a succeeding downstream conveyor. In this case, the intermediate conveyor likewise consists of a plurality of laterally adjacent, parallel conveyor portions driven at stepwise increasing speeds towards one side of the downstream conveyor. Furthermore, the intermediate conveyor is slightly inclined in a direction towards the downstream conveyor. At the higher side of the intermediate conveyor, a guide surface extends obliquely thereacross for actively deflecting the bottles sidewise over the intermediate conveyor.

Also in this apparatus, the pressure exerted by the bottles on one another and on the guide surface, which is determined by the shape of the guide surface and by the speeds of the conveyor portions, is again lower than in apparatus having two funnel-fashion converging guide surfaces. Nevertheless, the noise emission also of this apparatus, even at medium operating speeds; is still so high as to represent a danger to health.

It is an object of the invention to lower the noise level of apparatus as defined in the introduction by the employ of basic provisions and without detracting from the operating efficiency of the apparatus.

For attaining this object, the invention proposes a method wherein by transversely tilting the end section of the feed carrier, the resulting declivity drift causes the bottles to be crowded together, with the bottles of the lowermost row being passively supported by a support railing, and wherein by arranging the intermediate conveyor at the same inclination as the feed conveyor and by orienting the support railing towards a lower portion of the intermediate conveyor, the declivity drift causes the bottles to migrate onto the intermediate conveyor, whereon they are cause to slide over the successive acceleration zones so as to arrive at the maximum speed zone in a spaced arrangement, said support railing extending over the intermediate conveyor in such a curved arrangment that the lowermost bottles are biased into engagement with the support railing by the declivity drift also in the acceleration zones, while the bottles which are still at a higher level and are therefore accelerated with some delay are caused by the declivity drift to support themselves on the lower bottles and to intrude into the spaces formed therebetween. Thus the lateral movement of the bottles or similar containers over the intermediate conveyor, i.e. over the acceleration zones, is not brought about by the employ of any positively or actively acting guide surface, but solely by making use of the declivity drift. An arrangement of this kind was hitherto considered impossible by those skilled in the art, as it requires the intermediate conveyor to be tilted to a considerable degree for ensuring sufficient slippage of the bottles on its surface. On the other hand, such tilting of the conveyor makes the toppling of the bottles practically inavoidable.

In the case of a bottle depalletizing apparatus it has as a matter of fact already been tried to push the bottle standing on a tilted pallet by means of a pusher bar extending over the full width of the pallet onto a multiple-stage conveyor arranged in front of the pallet and at the same inclination and onto an inclined table located alongside thereof, and to let the bottles drift freely across the table and the conveyor under the influence of gravity. In this arrangement (DE-GM No. 1,975,166), however, the bottles lack lateral support, so that they are inclined to topple over. The conveyor consists of four laterally adjacent parallel belts driven at stepwise varying speeds. On pushing the bottles off the pallet and onto these laterally adjacent conveyor belts, the bottles are abruptly accelerated from the stationary condition to the respective conveyor speed without finding any support in the conveying direction by adjacent bottles due to the fact that the acceleration causes the bottles to be drawn out into a widely spaced arrangement. The most unfavourable conditions are obviously those prevailing at the lowermost conveyor belt having the highest speed, which functions also as the downstream conveyor in this known arrangement. After having been pushed off the pallet onto the upper portion of the table, the bottles slide down without any support towards the uppermost conveyor belt, whereat they are abruptly accelerated from their transverse movement to a relatively high speed in the conveying direction extending at right angles to the transverse movement, causing them to topple over in most cases. In addition, the bottles are arranged on the pallet not in laterally adjacent rows, but in alternately offset rows, so that each bottle of the offset rows comes to be positioned on a line separating two adjacent conveyor belts running at different speeds. During their transverse drift movement the bottles are practically without lateral support, so that even small jolts may cause the bottles to topple over.

The invention has most surprisingly succeeded in obviating this toppling tendency. Due to the fact that the lowermost row of bottles is already supported along the end section of the feed conveyor by the railing provided thereat, while the adjacent rows of bottles find support on the respective subjacent rows of bottles, and that further the bottles of the lowermost row are supported even in the acceleration zones by the support railing receding at an acute angle thereto, while the bottles which are still at a higher level are caused by the declivity drift to crowd the bottles at lower levels, a continuous and passive support for all bottles is ensured during their sliding or drifting movement.

The method according to the invention may be practiced by the employ of an apparatus wherein the end section of the feed conveyor laterally adjacent the intermediate conveyor and the section of the downstream conveyor succeeding the intermediate conveyor are inclined in the same manner as the intermediate conveyor and at such an angle that the resulting declivity drift causes the bottles to slide downwards over the laterally adjacent conveyor portions of the intermediate conveyor, the lowermost side of the feed conveyor being provided with a support railing connected adjacent the intermediate conveyor to the guide surface, the latter being formed as a support surface supporting the bottles at the lower side of the intermediate conveyor.

In accordance with the invention, it has been found particularly advantageous that the angle of inclination of the conveyor surfaces of the intermediate conveyor, the feed conveyor, and the downstream conveyor be about 10° to 12° with respect to the horizontal.

BRIEF DESCRIPTION OF THE DRAWINGS

An embodiment of the invention shall now be described with reference to the accompanying drawings, wherein.

DETAILED DESCRIPTION

Figure 1:
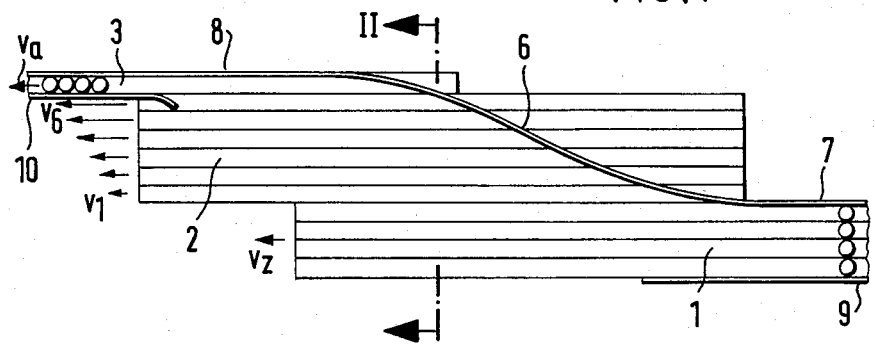
FIG. 1 shows a diagrammatical top plan view of an apparatus for rearranging bottles.
Figure 2:
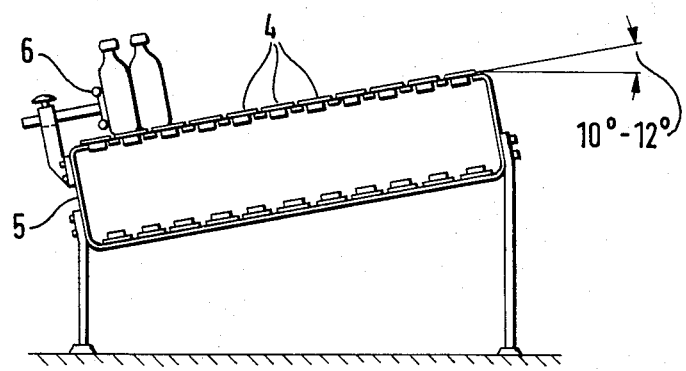
FIG. 2 shows a cross-sectional view of the apparatus taken along the line II—II in FIG. 1.

The apparatus shown in FIG. 1 comprises a feed conveyor 1, an intermediate conveyor 2, and a downstream conveyor 3, all of which may be formed in a per se known manner of hinged link chains 4 mounted on a frame 5 (FIG. 2). In the embodiment shown, feed conveyor 1 comprises four laterally adjacent hinged link chains driven with the same speed Vz and carrying the bottles in an upright and aligned position and in a densely closed arrangement, so that all of the hinged link chains of feed conveyor 1 may be wholly occupied by upright bottles. Located adjacent one side of feed conveyor 1 is an intermediate conveyor 2 extending parallel to feed conveyor 1.

Located adjacent the end section of intermediate conveyor 2 at the side thereof opposite feed conveyor 1 is a downstream conveyor 3 consisting of a single hinged link chain extending parallel to intermediate conveyor 2 and serving to feed the bottles to a not shown processing machine such as a bottle labelling machine or the like.

In the embodiment shown, intermediate conveyor 2 consists of six parallel hinged link chains 4 disposed closely adjacent one another and adapted to be driven at different speeds by a motor-gearbox unit (not shown). As indicated by speed arrows V1 to V6 in FIG. 1, the speed of hinged link chains 4 increases stepwise in the direction towards downstream conveyor 3.

As shown in FIG. 2, the plane conveying surface of intermediate conveyor 2 is inclined downwards in the direction of downstream conveyor 3 at an angle of about 10° with respect to the horizontal. The end section of feed conveyor 1 and the starting section of downstream conveyor 3 are inclined in the same manner, so that their conveying surfaces form a continuous plane surface free of any obstacles together with the surface of intermediate conveyor 2. Feed conveyor 1 is enclosed between a railing 9 at its higher side and a support railing 7 at its lower side. Adjacent intermediate conveyor 2, support railing 7 is joined to a support rail 6 extending obliquely across intermediate conveyor 2 at an acute angle to the direction of movement of hinged link chains 4. Adjacent the end portion of intermediate conveyor 2, support rail 6 is smoothly joined to a support railing 8 of downstream conveyor 3. Opposite support railing 8, the single file downstream conveyor 3 is defined by a further railing 10 having an arcuate end portion adjacent the end section of intermediate conveyor 2 so as to form an enlarged entry to downstream conveyor 3.

The optimum angle of inclination for feed conveyor 1, intermediate conveyor 2 and downstream conveyor 3 lies between about 10° and 12° as shown in FIG. 2. The speed Vz of feed conveyor 1 is lower than the speed V1 of the adjacent hinged link chain 4 of intermediate conveyor 2. The speed of each successive hinged link chain 4 of intermediate conveyor 2 is increased by one step relative to that of the preceding chain. The speed Va of downstream conveyor 3 finally is again faster than the speed V6 of the last hinged link chain 4 of intermediate conveyor 2.

The upper surface of each hinged link chain may be provided with a lubricant or the like for reducing the friction between the respective hinged link chain and the bottles standing thereon.

The bottles arrive on the feed conveyor 1 in a closely packed arrangement on the laterally adjacent hinged link chains thereof, and at the uniform speed Vz. Due to the inclination of feed conveyor 1, the bottles standing on the lowermost hinged link chain are brought into supporting engagement with support railing 7, while the bottles on the adjacent higher chains are supported by the bottles travelling at a lower level. This is due to the tendency of the bottles to slide or drift downwards to the lowermost side of feed conveyor 1 under the effect of gravity. In other words, conditions must be provided for assuring the laterally downward sliding velocity vector of each bottle and the conveying velocity vectors (Vz, V1–V6, Va) of each bottle will produce a resultant velocity vector which will intersect each of the support railing sections 6, 7 and 8.

As the bottles standing on the lowermost hinged link chain 4 of the feed conveyor 1 arrive at the upstream end portion of the support rail 6 and are subsequently supported thereby, they drift downwards onto the first hinged link chain 4 of intermediate conveyor 2, which is driven at the higher speed V1, whereby these bottles are drawn apart due to the speed difference. This lowermost row of bottles remains in supporting engagement with the support rail 6 also along the further conveying path, as the declivity drift causes them to slide downwards across intermediate conveyor 2, resulting in their being successively accelerated by each hinged link chain 4 up to the speed V6 of the last hinged link chain. In the meantime, the declivity drift causes the bottles travelling at higher levels to support themselves on the bottles at lower levels and to intrude into the spaces forming therebetween due to the successive accelerations of the travelling speed, so that during the travel of the bottles across intermediate conveyor 2 these spaces are filled by the bottles crowding thereinto from the respective higher levels, resulting in a single file or row of bottles being formed at the level of downstream conveyor 3.

Despite the relatively great angle of inclination of feed conveyor 1, intermediate conveyor 2 and downstream conveyor 3, there is no tendency of the upstanding bottles to topple over even in the acceleration zone of intermediate conveyor 2, because the lowermost row of bottles is always supported by support rail 6, while the bottles travelling at higher levels are caused by the declivity to drift downwards into supporting engagement with the bottles at lower levels and to intrude with a gentle force into the spaces forming between the bottles of the lowermost row. This intrusion is favoured by the fact that the bottles travelling at higher levels of intermediate conveyor 2 move at a slower speed than those travelling at lower levels, so that there is always a speed difference between the lowermost bottles supported by rail 6 and the bottles immediately thereabove. The relationship between the speeds of feed conveyor 1, intermediate conveyor 2 and downstream conveyor 3 is suitably selected such that the speed V1 of the first hinged link chain of intermediate conveyor 2 is about twice the speed Va of feed conveyor 1. The speed Va of downstream conveyor 3 may for instance be five times the speed Vz of feed conveyor 1.

The speeds of the further hinged link chains 4 of intermediate conveyor 2 preferably increase by substantially uniform steps, the speed Va of downstream conveyor 3 being about one further such step faster than the speed V6 of the fastest-running hinged link chain of intermediate conveyor 2, so that the bottles are drawn apart slightly further as they pass onto the downstream conveyor. This is particularly important in case there are bottles left over adjacent the entry of the downstream conveyor that have not been able to crowd themselves into the single row of bottles, which might otherwise result in problems occurring in that section of the downstream conveyor which is provided with railings on both sides.

The feed conveyor 1, intermediate conveyor 2 and downstream conveyor 3 do not have to be inclined exactly at the same angle, as long as it is ensured that the declivity drifting force is great enough to cause the bottles to slide across the intermediate conveyor transversely to the conveying direction, while avoiding the danger of the bottles' toppling over. For obvious reasons, this danger is considerably smaller on feed conveyor 1 as well as on downstream conveyor 3.

The embodiments of the invention in which an exclusive property or privilege is claimed are defined as follows:

1. A method for transferring bottles arriving in an upright position and in laterally adjacent rows on a feed conveyor traveling at a first velocity across an intermediate conveyor traveling at a second velocity faster than said first velocity and into a single row of bottles on a downstream conveyor traveling at a third velocity, the steps comprising:

tilting the plane of each of said feed conveyor, said intermediate conveyor and said downstream conveyor in the same direction and to a sufficient angle to cause the upstanding bottles to slide laterally down the slope of said conveyors as said bottles are conveyed in a direction toward and along said downstream conveyor;

continuously passively guiding by a support rail the lowermost ones of said bottles on each of said conveyors so as to keep them in said upright position;

accelerating the velocity of said bottles in a direction toward said downstream conveyor as they slide from said feed conveyor across said intermediate conveyor to create spaces between mutually adjacent bottles engaging said support rail, the bottles which are still at a higher position on said conveyors being accelerated with some delay and slide laterally into said spaces as they become formed, while other bottles are continuously passively supported in wall-to-wall contact with each other on the next lower ones of said bottles on each of said conveyors as all of said bottles continue to move to said downsteam conveyor.

2. The method according to claim 1, wherein said downstream conveyor is driven at a speed Va approximately five times the speed Vz of said feed conveyor.

3. The method according to claim 1, wherein said intermediate conveyor includes plural and successively faster conveyor reaches, and wherein said bottles, in a direction towards said downstream conveyor, are continuously accelerated across each of said reaches.

4. The method according to claim 3, wherein said conveyor reach of said intermediate conveyor located adjacent said feed conveyor is driven at a speed V1 about twice the speed Vz of said feed conveyor.

5. The method according to claim 4, wherein the other conveyor reaches are driven at speeds V2–V6 increasing in substantially uniform steps.

6. The method according to claim 5, wherein said downstream conveyor is driven at a speed about one step greater than the speed V6 of the adjacent conveyor reach in said intermediate conveyor.

7. The method according to claim 1, wherein said downward sliding of said bottles is regulated so that a laterally downward sliding velocity vector of said bottles and the conveying velocity vectors of each of said conveyors (Vz, V1–V6, Va) will produce a resultant velocity vector which intersects said support railing.

8. An apparatus for transferring bottles arriving in an upright position and in laterally adjacent rows on a feed conveyor traveling at a first velocity across an intermediate conveyor traveling at a second velocity faster than said first velocity and into a single row of bottles on a downstream conveyor traveling at a third velocity, comprising:

support means for effecting a tilting of the plane of each of said feed conveyor, said intermediate conveyor and said downstream conveyor in the same direction and to a sufficient angle to cause the standing bottles to slide laterally down the slope of said conveyors as said bottles are conveyed in a direction toward and along said downstream conveyor;

support rail means oriented along a lower portion of each of said feed conveyor, said intermediate conveyor and said downstream conveyor for continuously passively guiding the lowermost ones of said bottles on each of said conveyors so as to keep them in said upright position, the difference in speed between at least said feed conveyor and said intermediate conveyor causing spaces to occur at least between mutually adjacent bottles engaging said support rail means, the bottles which are still at a higher position on said conveyors being accelerated with some delay and slide laterally into said spaces as they become formed while other bottles are continuously passively supported in wall-to-wall contact with each other on the next lower ones of said bottles on each of said conveyors as all of said bottles continue to move to said downstream conveyor.

9. The apparatus according to claim 8, wherein said support rail means includes a continuous support rail extending along the lower side of said feed conveyor and said downstream conveyor and obliquely across said intermediate conveyor along the lower side thereof.

10. The apparatus according to claim 8, wherein the inclination angle of the conveyor surfaces of said feed conveyor, said intermediate conveyor and said downstream conveyor is in the range of about 10° to 12° with respect to the horizontal.

11. The apparatus according to claim 8, wherein means are provided for effecting a regulation of the velocity of said laterally downwardly sliding of said bottles so that said downward sliding velocity vector thereof and the conveying velocity vectors (Vz, V1–V6, Va) thereof will produce a resultant velocity vector which intersects said support rail means.

12. The apparatus according to claim 11, wherein said means includes a lubricating means on each said feed conveyor, said intermediate conveyor and said downstream conveyor.

13. The apparatus according to claim 11, wherein said means includes a limiting of said angle to the range of 10° to 12° with respect to the horizontal.

* * * * *